No. 722,252. PATENTED MAR. 10, 1903.
H. DE C. RICHARDS.
CONVEYER BELT.
APPLICATION FILED MAR. 24, 1902.
NO MODEL.
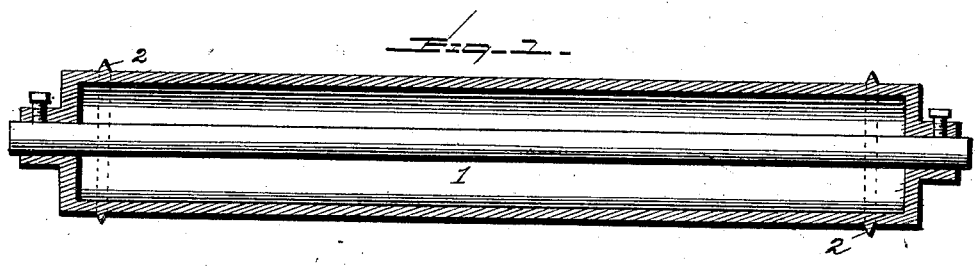
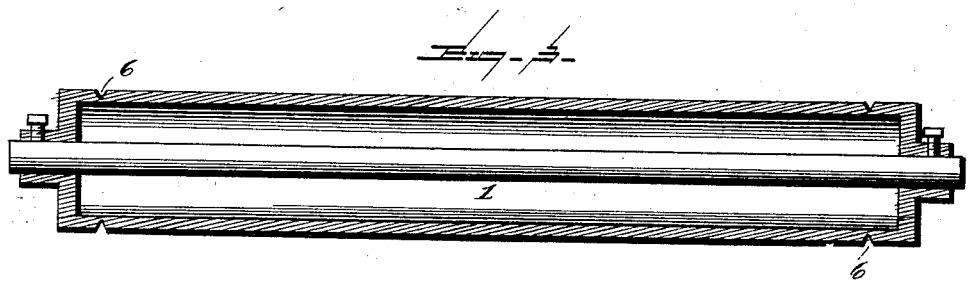
WITNESSES: INVENTOR
H. De C. Richards
BY
Attorney

UNITED STATES PATENT OFFICE.

HARRY DE C. RICHARDS, OF SUTTERCREEK, CALIFORNIA.

CONVEYER-BELT.

SPECIFICATION forming part of Letters Patent No. 722,252, dated March 10, 1903.

Application filed March 24, 1902. Serial No. 99,670. (No model.)

*To all whom it may concern:*

Be it known that I, HARRY DE C. RICHARDS, a citizen of the United States, residing at Suttercreek, in the county of Amador and State of California, have invented certain new and useful Improvements in Conveyer-Belts; and I do hereby declare the following to be a full, clear, and exact description of the invention, such as will enable others skilled in the art to which it appertains to make and use the same.

My invention relates to "conveyers," but more particularly to endless aprons and drums therefor, and has for its object to provide a non-slipping and non-creeping apron or belt.

A further object of my invention is to provide a device of the above-named class which is extremely simple in its construction and absolutely efficient.

With these objects in view my invention consists in providing an apron or belt with one or more endless longitudinal grooves and in providing the drums with one or more corresponding annular projections.

Referring to the accompanying drawings, Figure 1 is a longitudinal section of a drum provided with two annular projections. Fig. 2 is a transverse section of a belt or apron provided with two longitudinal endless grooves. Fig. 3 is somewhat of a modification showing the drum provided with two annular grooves, while Fig. 4 shows the belt or apron with the longitudinal endless ridges or projections.

Like numerals of reference indicate the same parts throughout the several figures, in which—

1 is a belt-drum provided with one or more annular ridges or projections 2, preferably V-shaped when viewing the bottom of the drum.

3 indicates a belt or apron provided with the longitudinal endless walls 4, which are provided in the under sides thereof with a longitudinal endless groove 5, formed, preferably, like an inverted V.

6 indicates one or more annular grooves in the drum, and 7 indicates one or more corresponding longitudinal endless ridges or projections, formed, preferably, like a V, on the belt. As to these constructions I prefer the former, although the principle, operation, and object attained are the same whether the drums or the apron are provided with the grooves. As a matter of fact, the belt or apron may or may not have the corresponding ridges or grooves, and the drum may be provided with one or more ridges or grooves, as may be desired; but they must be so constructed as to register or mate with each other.

The operation of my invention is obvious, the object being to entirely obviate the lateral creeping or slipping of a belt or the apron on the drums, and my construction is not to be confounded with those drums or rollers which are provided with annular flanges to guide a belt or apron, as the belt will invariably creep up one or the other of said flanges, while it is impossible for my belt or apron to have any lateral motion whatever.

In order to make my invention operative, it is not necessary to supply all the drums or rollers with the grooves or ridges, as it may be only applied to the under rollers or drums or to the end rollers or drums, or may be applied to conveyer or driving belts or to conveying-pulleys, idlers, or drums, the principle and object attained being exactly the same.

If desired, a metal or other strip or runner may be attached to under side of belt to fit the grooves or ridges of the drum or drums.

What I claim as new, and desire to secure by Letters Patent of the United States, is—

1. The combination of a belt provided with longitudinal endless walls, along its edges, said walls being provided with longitudinal grooves therein, with a drum having annular ribs or projections to engage said grooves, substantially as described.

2. The combination of a belt provided with longitudinal walls along its edges, said walls being provided with longitudinal V-shaped grooves therein, with a drum having annular V-shaped ribs or projections to engage said grooves, substantially as described.

In testimony whereof I affix my signature in presence of two witnesses.

H. DE C. RICHARDS.

Witnesses:
 W. L. ROSE,
 C. HUGH DUFFY.